United States Patent
Lakshamanan et al.

(10) Patent No.: US 7,912,319 B2
(45) Date of Patent: Mar. 22, 2011

(54) SYSTEMS AND METHODS FOR PANORAMIC IMAGE CONSTRUCTION USING SMALL SENSOR ARRAY

(75) Inventors: Srinivasan Lakshamanan, Penang (MY); Nobutaka Itagaki, Tokyo (JP)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1241 days.

(21) Appl. No.: 11/510,947

(22) Filed: Aug. 28, 2006

(65) Prior Publication Data
US 2008/0050038 A1 Feb. 28, 2008

(51) Int. Cl.
*G06K 9/36* (2006.01)
(52) U.S. Cl. .................. 382/284; 382/276; 382/293
(58) Field of Classification Search .......... 382/276, 382/284–285, 293–294
See application file for complete search history.

(56) References Cited

U.S. PATENT DOCUMENTS

| | | | | |
|---|---|---|---|---|
| 3,688,676 A * | 9/1972 | Cruickshank et al. | ........ | 396/428 |
| 4,943,821 A * | 7/1990 | Gelphman et al. | ........ | 396/24 |
| 5,657,402 A * | 8/1997 | Bender et al. | ........ | 382/284 |
| 5,764,809 A * | 6/1998 | Nomami et al. | ........ | 382/284 |
| 5,920,657 A * | 7/1999 | Bender et al. | ........ | 382/284 |
| 5,960,108 A * | 9/1999 | Xiong | ........ | 382/154 |
| 5,963,664 A * | 10/1999 | Kumar et al. | ........ | 382/154 |
| 6,002,430 A * | 12/1999 | McCall et al. | ........ | 348/207.99 |
| 6,009,190 A * | 12/1999 | Szeliski et al. | ........ | 382/154 |
| 6,011,558 A * | 1/2000 | Hsieh et al. | ........ | 345/629 |
| 6,044,181 A * | 3/2000 | Szeliski et al. | ........ | 382/284 |
| 6,118,595 A * | 9/2000 | Miller | ........ | 359/725 |
| 6,157,747 A * | 12/2000 | Szeliski et al. | ........ | 382/284 |
| 6,304,284 B1 * | 10/2001 | Dunton et al. | ........ | 348/36 |
| 6,389,179 B1 * | 5/2002 | Katayama et al. | ........ | 382/284 |
| 6,393,162 B1 * | 5/2002 | Higurashi | ........ | 382/284 |
| 6,434,265 B1 * | 8/2002 | Xiong et al. | ........ | 382/154 |
| 6,456,323 B1 * | 9/2002 | Mancuso et al. | ........ | 348/218.1 |
| 6,466,262 B1 * | 10/2002 | Miyatake et al. | ........ | 382/284 |
| 6,522,787 B1 * | 2/2003 | Kumar et al. | ........ | 382/268 |
| 6,587,597 B1 * | 7/2003 | Nakao et al. | ........ | 382/284 |
| 6,618,511 B1 * | 9/2003 | Mancuso et al. | ........ | 382/293 |
| 6,661,455 B1 * | 12/2003 | Toyofuku et al. | ........ | 348/231.6 |
| 7,133,068 B2 * | 11/2006 | Fisher et al. | ........ | 348/218.1 |

FOREIGN PATENT DOCUMENTS

| | | |
|---|---|---|
| JP | 9-18750 | 1/1997 |
| JP | 10-155109 | 6/1998 |
| JP | 2002-62564 | 2/2002 |
| JP | 2004/236156 | 8/2004 |
| JP | 2005/229290 | 8/2005 |

* cited by examiner

*Primary Examiner* — Manav Seth

(57) ABSTRACT

Images are constructed by compositing a plurality of sequential images. The sequential images are obtained by moving the image capture device and storing the positional attribute data (focal attributes) in association with each captured image. For example, wide-angle views, 3D views and/or video views of a subject can be constructed by compositing a plurality of sequential images.

20 Claims, 3 Drawing Sheets

SYSTEMS AND METHODS FOR PANORAMIC IMAGE CONSTRUCTION USING SMALL SENSOR ARRAY

TECHNICAL FIELD

This disclosure relates to systems and methods for capturing images and more particularly to compositing a plurality of images representing portions of a field of view in order to create a larger image.

BACKGROUND OF THE INVENTION

Image input devices, such as digital cameras, have a limited field of view (FOV) and produce images representing only a small portion of the surrounding area. Conventional image acquisition methods addressing the need for larger fields of view have included optical approaches, such as fish eye lenses. Conventional large FOV image acquisition approaches have substantial limitations, in particular they exhibit distortion, particularly at the image edges.

Prior art systems and methods are not capable of solving the problems in the conventional wide-viewfield image input methods, nor are they capable of acquiring wide-viewfield images having a high degree of resolution without employment of a larger pixel array.

BRIEF SUMMARY OF THE INVENTION

Images are constructed by compositing a plurality of sequential images. The sequential images are obtained by moving the image capture device and storing the positional attribute data (focal attributes) in association with each captured image. For example, wide-angle views, 3D views and/or video views of a subject can be constructed by compositing a plurality of sequential images.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
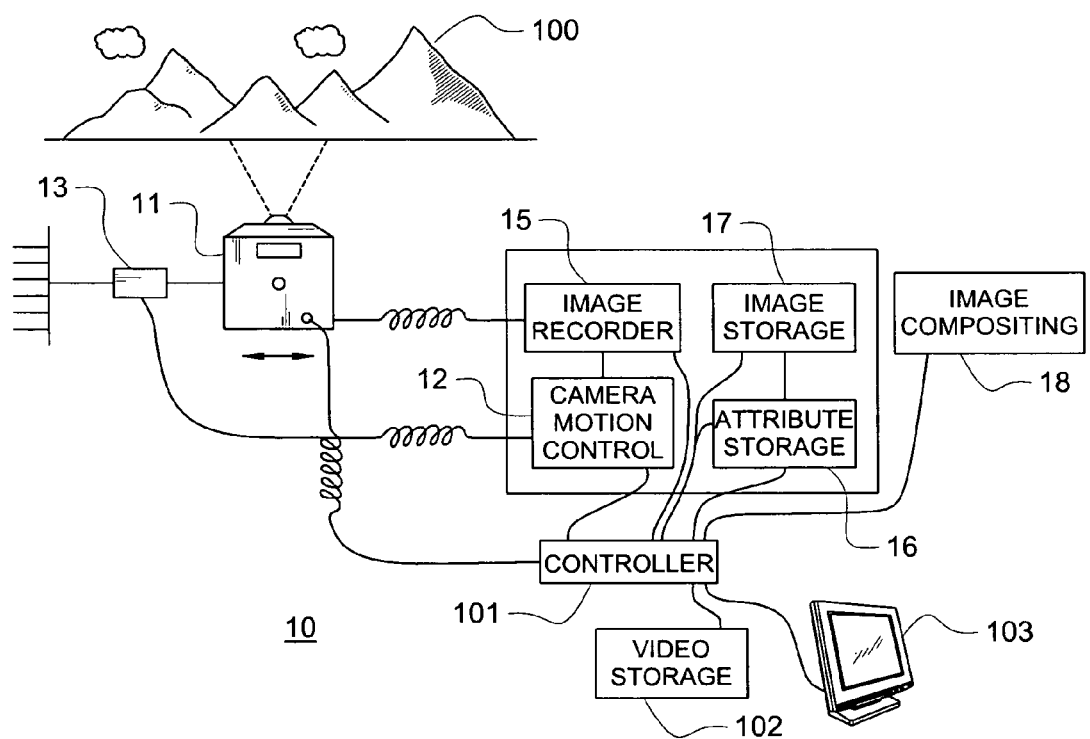
FIG. 1 shows an embodiment of an image acquisition system.

FIG. 1 shows an image capture apparatus 10, having camera 11 which acquires images of a portion of external field 100, and camera motion control 12 which controls camera positioning mechanism 13. Camera positioning mechanism 13 alters the orientation of camera 11 relative to external field 100 so that camera 11 is situated to acquire a particular portion of the view field. Camera positioning mechanism 13 can move the entire camera or portions thereof, for example, the camera lens (not shown) relative to the stationary camera body or the image capturing device within the camera body.

Image recorder 15 incorporates images taken by camera 11 into the apparatus 10 and obtains and/or stores attribute data of the partial images. Also stored is position information obtained for each image recorded during the acquisition of the partial images. Attribute data collected or determined by image recorder 15 is stored in image attribute memory 16. Images collected by image recorder 15 are stored as image files in image memory 17. Imaging compositing system 18 combines images into a larger field of view image based on image information received from image memory 17 and image attribute memory 16.

Apparatus 10 includes main controller 101 which provides control signals to other components, including camera motion control 12, image attribute memory 16, image compositing system 18 and image memory 17.

Portions of apparatus 10 may be implemented in software and/or hardware and may be integrated into one or more assemblies, including but not limited to a camera, computer, programmable controller, dedicated hardware assembly, etc. Image memory 17 defines at least a portion of a means for storing a plurality of image segments. Controller 101 defines at least a portion of a means for retrieving segmented images from, for example, image memory 17. Image attribute memory 16 is accessed during the identification of image segments as component portions of a composite panoramic image. Image compositing system 18 accesses image memory 17 and image attribute memory 16 during a process of composing a panoramic image from the captured image segments stored, for example, in image memory 17. Image memory 17 and image attribute memory 16 may be combined into a single memory assembly wherein images are stored along with attribute data.

Figure 2:
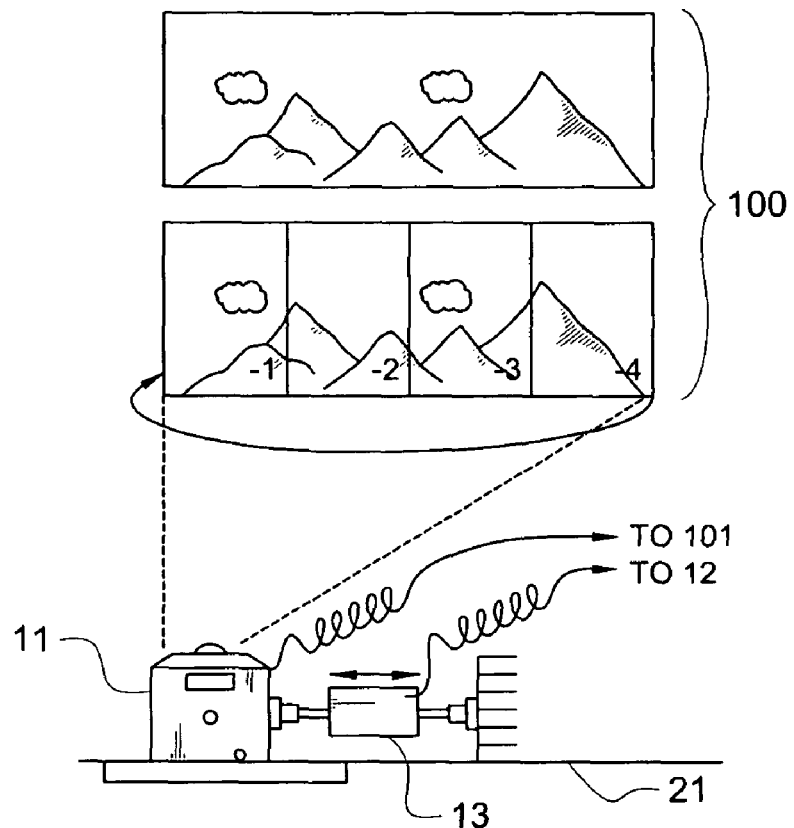
FIG. 2 shows a portion of the embodiment of FIG. 1.

Referring to FIG. 2, the orientation of camera 11 can be changed by camera positioning mechanism 13 under the control of camera positioning control 12 and controller 101. Camera 11 may be any of a variety of cameras now known or later developed, and in this example, camera 11 includes a small sensor (not shown) having, for example, a 1280 by 1024 pixel array. Camera positioning mechanism 13 operates to alter the orientation of camera 11 in accordance with directives of positioning control 12. In other embodiments positioning control 12 can be incorporated within controller 101 or within camera 11. Camera 11 is capable of acquiring images in cooperation with the positioning control mechanism 12, which provides directives in the form of analog and/or digital control signals to camera positioning mechanism 13 so as to alter the orientation of camera 11 relative to the view field.

Camera 11 acquires partial images (100-1, 100-2, 100-3, 100-4) of field of view 100 in response to received control signals from image recorder 15 and/or controller 101. Camera 11 movement described above is usually performed before acquisition of each partial image. Image recorder 15 stores the partial images from camera 11 in an image memory (e.g., image storage 17 of FIG. 1), which may be part of controller 101 in some embodiments. Image recorder 15 also stores attribute data relating to the orientation of camera 11 during image acquisition in an image attribute memory 16, which may also be part of controller 101 in some embodiments.

Returning to FIG. 1, image compositing system 18 determines the compositing positions of the partial images using the position data from camera 11 from the acquisition of each partial images stored in image attribute memory 16. Image compositing system 18 composites partial images stored in image memory 17 to create larger images made of one or more partial images. By performing one or more compositing operations, apparatus 10 is capable of acquiring a wide-view-field composite image using a relatively small field-of-view detector.

The partial images or composite images obtained by apparatus 10 are displayed by display 103 and presented to a user. Additionally, the image system may be utilized to capture wide-view video.

FIG. 2 shows an example adapted for wide-view video acquisition using camera 11 coupled to linear positioning control mechanism 13. Control mechanism 13 may include a piezoelectric or electric actuator, a hydraulic or pneumatic actuator or the like. Control mechanism 13 may include one or more micro-electromechanical systems (MEMS) including mechanical elements, sensors, actuators, and electronics. In this example, camera 11 is coupled to an actuator through positioning control mechanism 13 so as to provide a control with a single degree of freedom, for example, camera 11 can slide back and forth. Positioning control mechanism 13 and its supporting structures may include a variety of different systems for providing a controllable movement of camera 11 relative to the subject field. For example, camera 11 may be coupled to linkages, sliding elements, gears, wires, pulleys, transmissions (not shown) with positioning control mechanism 13 operatively engaged to provide precise controllable movement of camera 11. An actuator may include electrical, electromechanical and/or pneumatic means for providing movement.

In the embodiment of FIG. 2, camera 11 is adapted to slide upon a surface, such as frame 21, with the position of camera 11 determined by control mechanism 13. Composite, panoramic video images may be obtained by quickly cycling camera 11 position relative to the field of view. As illustrated, camera 11 may be cycled between four positions to acquire four partial images of the subject field. As described above, these four partial images can be composited via image compositing system 18 into a single panoramic image of the subject field. Note that the movement mechanism can be any type of mechanism desired for the particular use, including but not limited to: an electric linear actuator; a piezoelectric element which responds to a control signal; a pair of linear actuators adapted to provide at least two degrees of freedom to said image capture device; one or more Micro-electromechanical systems (MEMS) including mechanical elements, sensors, actuators, and electronics.

Camera control mechanism 13 can be synchronized with a frame speed of camera 11 so as to acquire a composite view of the subject that is wider than any individual imaged capture by camera 11. In one embodiment, camera control mechanism 13 repositions camera 11 within a time interval defined by the frame speed of camera 11 so as to acquire a wider field of view, though at a slower "effective" frame speed. If, for example, camera 11 has a frame speed of 4 frames per second and each image takes, for example, $\frac{1}{8}^{th}$ of a second to acquire, camera control mechanism 13 would have approximately $\frac{1}{8}^{th}$ of a second to move camera 11 into the next position. In this example, the effective frame speed for the composite image would be one frame per second. As a result, a trade-off can be realized between captured image size and image acquisition rate (frame speed).

Figure 3:
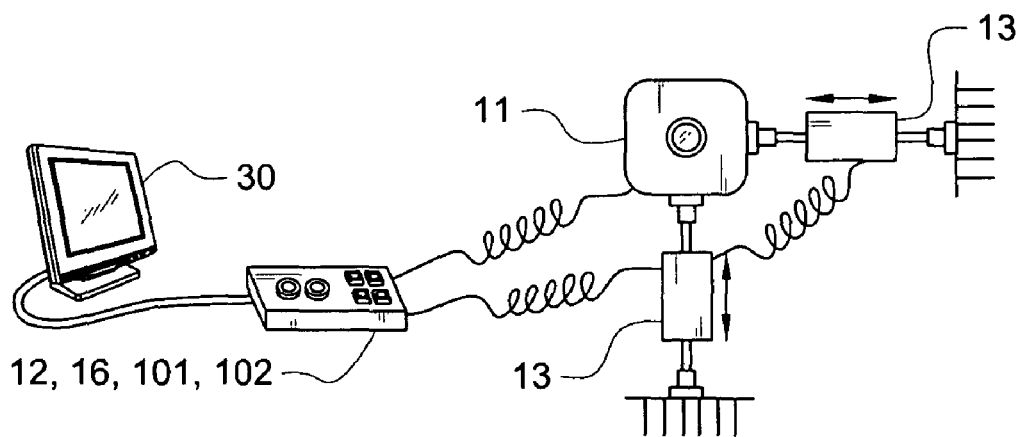
FIG. 3 shows an embodiment of an image acquisition system where the camera is adapted to move with multiple degrees of freedom.

FIG. 3 shows another embodiment adapted for wide-view video acquisition using camera 11 coupled to linear positioning control mechanisms 13. In this embodiment, camera 11 is adapted to move in two dimensions with the position of camera 11 controlled by control mechanisms 13. Composite, panoramic video images may be obtained by cycling the camera position relative to the field of view. An advantage of such a system includes lower cost due to less silicon to capture a large field of view.

Figure 4:
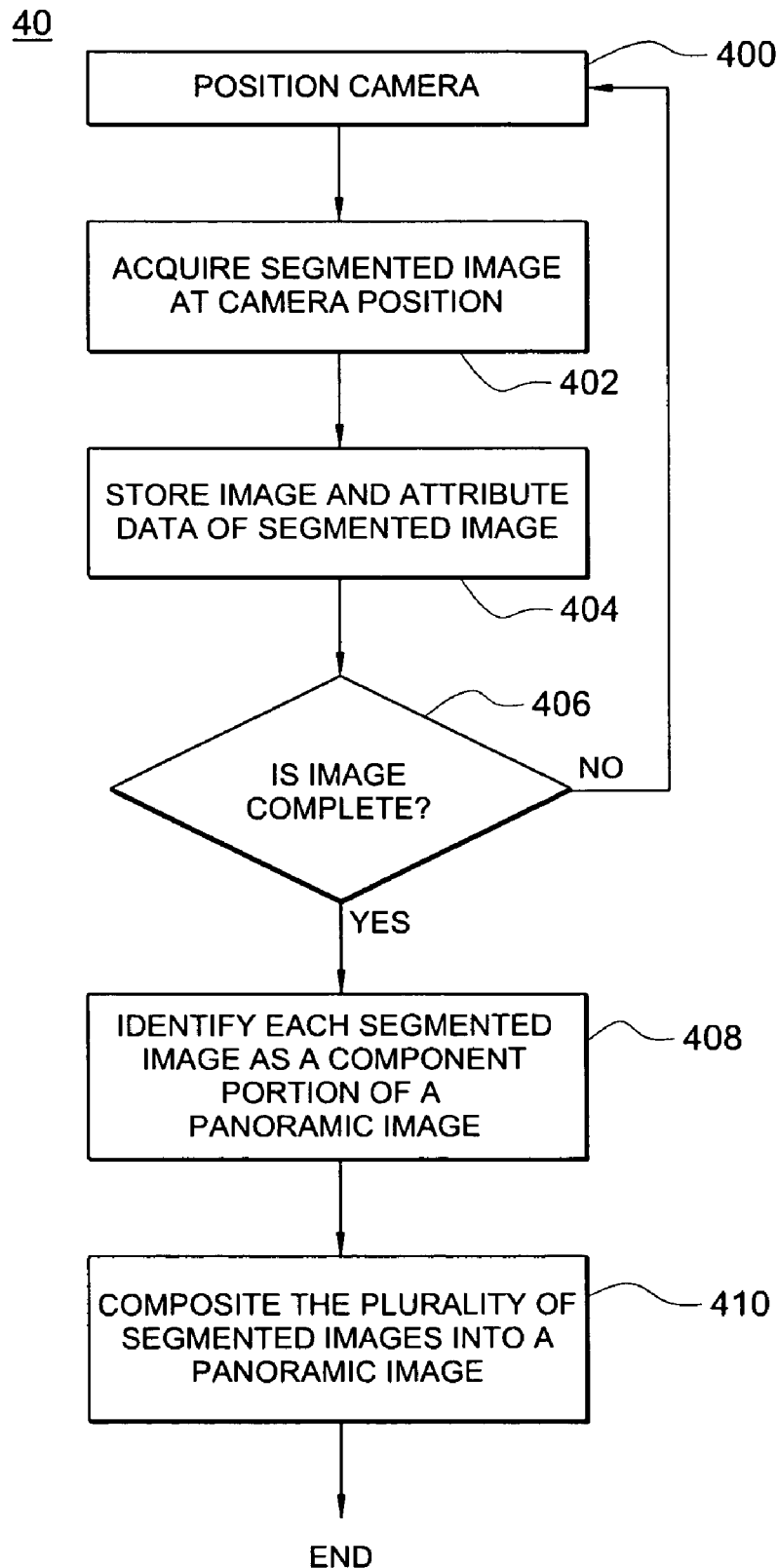
FIG. 4 is a flow chart of one embodiment of the invention where a movable camera is provided in multiple different positions to acquire image portions of a subject.

FIG. 4 is a flow chart of one embodiment 40 of the invention. Process 400 positions camera 11 relative to a subject. Process 402 captures a portion of the subject as an image file along with attribute data of the captured image portion. Process 404 stores the captured image and attribute data.

Process 406 determines if the image acquisition is incomplete. Once the image acquisition is complete, process 408 identifies or determines an association between the captured image portions and the stored attribute data. Process 410 then creates a panoramic image after compositing the plurality of partial images in accordance the stored attribute data.

Note that while the partial images captured for each subject form a sequent set of images for creating a wide-angle view of the subject, the concepts discussed herein could be used to create other image types, such as three-dimensional (3D) images. For such 3D images the camera (or a capture device within the camera) could be moved a relatively small distance (to simulate a pair of eyes) laterally with respect to the subject.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An image acquisition system comprising:
   a camera comprising:
      an image capture device within the camera, the image capture device configured to capture images;
      a camera lens; and
      a camera housing;

a memory for storing a sequential set of images with respect to a particular subject, each image taken with a different set of focal attributes; and a positioning mechanism configured to move one of the camera, the image capture device within the camera, or the camera lens between a plurality of positions relative to the particular subject to capture a composite view of the subject that is wider than any individual image of the subject captured by the camera, wherein the positioning mechanism is further configured to reposition either the camera, the image capture device within the camera, or the camera lens in synchronization with a frame speed of the camera, such that the camera, the image capture device, or the camera lens is repositioned in an amount of time which is less than or equal to a time interval determined by subtracting an amount of time required by the camera to acquire one image of the subject from an inverse of the camera's frame speed, thereby resulting in an effective frame speed for capturing the composite view that is less than an actual frame speed of the camera.

2. The image acquisition system of claim 1, further comprising:

the positioning mechanism configured to move one of the camera, the image capture device, or the camera lens between a fixed array of positions relative to the subject.

3. The image acquisition system of claim 2, wherein positioning mechanism comprises at least one device selected from the following list: an electric linear actuator; a piezoelectric element which responds to a control signal; a pair of linear actuators adapted to provide at least two degrees of freedom to the image capture device, or one or more microelectromechanical systems (MEMS) including mechanical elements, sensors, actuators, and electronics.

4. The image acquisition system of claim 2, wherein positioning mechanism is adapted to move the image capture device within the camera in both horizontal and vertical directions.

5. The image acquisition system of claim 2, wherein the positioning mechanism is located within the camera housing.

6. The image acquisition system of claim 1, wherein the images are video images.

7. The image acquisition system of claim 2, wherein the positioning mechanism is synchronized with an image acquisition rate of the image capture device.

8. An image acquisition system comprising:
a camera;
a camera lens;
an image capture device within the camera, the image capture device configured to acquire an image of a portion of a subject at a plurality of positions relative to the subject;
a position controller configured to move at least one of the camera, the camera lens, or the image capture device within the camera between the plurality of positions relative to the subject in an amount of time which is less than or equal to a time interval determined by subtracting an amount of time required by the camera to acquire one image of the subject from a value derived by the camera's frame speed, thereby resulting in an effective frame speed for capturing a composite image of the subject that is less than an actual frame speed of the camera; and an image composite system configured to create the composite image by stitching together the plurality of images into a single image, the composite image using focal attribute data acquired along with each of the plurality of acquired images.

9. The image acquisition system of claim 8, wherein the position controller comprises one or more micro-electromechanical systems (MEMS).

10. The image acquisition system of claim 8, wherein the position controller includes one or more linear actuators.

11. The image acquisition system of claim 8, wherein the position controller includes a piezoelectric linear actuator.

12. The image acquisition system of claim 8, wherein the position controller is configured to provide a signal to control acquisition of each of the images.

13. The image acquisition system of claim 11, wherein the position controller is configured to move the image capture device in a fixed array of positions as the image capture device acquires plurality of partial images of the subject in synchronization with an image acquisition rate of the image capture device until an entire image of the subject is captured.

14. The image acquisition system of claim 11, wherein the position controller is synchronized with an image acquisition rate of the image capture device.

15. A method of image acquisition of a subject comprising:
acquiring a digital image file and position data pertaining to the image file at a plurality of sequentially different positions relative to the subject, the digital image files are acquired by a camera with an image capture device and a camera lens;
moving one of the camera, the image capture device, or the camera lens through the plurality of sequentially different positions relative to the subject in synchronization with an image acquisition rate of the image capture device such that movement between sequentially different positions is achieved in an amount of time which is less than or equal to a time interval determined by subtracting an amount of time required by the camera to acquire an image of the subject from a value derived by the camera's frame speed;
storing the image files and position data; and
compositing the image files with reference to the position data into a composite image of the subject, the composite image providing more information to a view than any one of the acquired image files.

16. The method of claim 15, wherein the acquiring comprises:
moving the camera relative to the subject.

17. The method of claim 15 wherein the acquiring comprises:
moving the camera with a linear actuator in response to a signal received from a controller.

18. The method of claim 15, wherein the composite image is a wide-angle view of the subject.

19. The method of claim 15, wherein the composite image is a 3D view of the subject.

20. The method of claim 15, wherein said the acquiring comprises:
synchronizing movement of the image capture device between a fixed array of sequentially different positions with an image acquisition rate of the image capture device.

* * * * *